(12) United States Patent
Iwasa

(10) Patent No.: US 8,120,851 B2
(45) Date of Patent: Feb. 21, 2012

(54) OPTICAL MATERIAL AND OPTICAL ELEMENT, DIFFRACTION OPTICAL ELEMENT, AND STACKED TYPE DIFFRACTION OPTICAL ELEMENT MOLDED THEREOF

(75) Inventor: Hidefumi Iwasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 11/960,117

(22) Filed: Dec. 19, 2007

(65) Prior Publication Data
US 2008/0170295 A1 Jul. 17, 2008

(30) Foreign Application Priority Data
Jan. 11, 2007 (JP) ................... 2007-003597

(51) Int. Cl.
*G02B 5/18* (2006.01)
(52) U.S. Cl. ........................................ 359/576; 359/569
(58) Field of Classification Search ................... 359/569
See application file for complete search history.

(56) References Cited

U.S. PATENT DOCUMENTS

| | | | |
|---|---|---|---|
| 2,449,951 A | 9/1948 | Ney | 548/401 |
| 3,914,129 A | 10/1975 | Wylot et al. | 106/47 Q |
| 4,420,225 A | 12/1983 | Bömer et al. | 350/409 |
| 5,035,473 A | 7/1991 | Kuwayama et al. | 350/3.7 |
| 5,048,925 A | 9/1991 | Gerritsen et al. | 359/565 |
| 5,343,317 A | 8/1994 | Wada et al. | 359/73 |
| 5,662,951 A | 9/1997 | Greshes | 425/384 |
| 5,847,877 A | 12/1998 | Imamura et al. | 359/566 |
| 5,879,837 A | 3/1999 | Yoshinaga et al. | 430/2 |
| 5,898,511 A | 4/1999 | Mizutani et al. | 359/13 |
| 6,059,411 A | 5/2000 | Moody | 351/118 |
| 6,061,110 A | 5/2000 | Hisatake et al. | 349/113 |
| 6,090,332 A | 7/2000 | Marder et al. | 264/435 |
| 6,144,502 A | 11/2000 | Hayakawa et al. | 359/726 |
| 6,157,488 A | 12/2000 | Ishii | 359/569 |
| 6,188,522 B1 | 2/2001 | Kimura et al. | 359/649 |
| 6,229,654 B1 | 5/2001 | Cabeza et al. | 359/657 |
| 6,262,846 B1 | 7/2001 | Nakai | 359/576 |
| 6,330,110 B2 | 12/2001 | Nakai | 359/576 |
| 6,381,079 B1 | 4/2002 | Ogawa | 359/759 |
| 6,426,812 B2 | 7/2002 | Ichikawa et al. | 359/22 |
| 6,480,332 B1 | 11/2002 | Nakai | 359/566 |
| 6,560,019 B2 | 5/2003 | Nakai | 359/569 |
| 6,606,200 B1 | 8/2003 | Nakayama et al. | 359/686 |

(Continued)

FOREIGN PATENT DOCUMENTS
EP 0 488 627 A2 6/1992
(Continued)

OTHER PUBLICATIONS

Hooper "Highly Conductive Siloxane Polymers" Macromolecules 2001, 34, 931-936.*

(Continued)

*Primary Examiner* — Arnel C Lavarias
(74) *Attorney, Agent, or Firm* — Fitzpatrick, Cella, Harper & Scinto

(57) ABSTRACT

Use of an organic optical material whose Abbe's number (vd) and secondary dispersion (θg,F) satisfy the relationship $\theta_{g,F} \leq -2v_d \times 10^{-3} + 0.59$ provides an optical material which causes reduced optical scattering, the optical material having excellent optical scattering characteristics and secondary dispersion characteristics equivalent to those of a compound in which fine particles of conductive metal oxides such as ITO are dispersed in an organic resin.

4 Claims, 8 Drawing Sheets

U.S. PATENT DOCUMENTS

| | | | |
|---|---|---|---|
| 6,759,471 B1 | 7/2004 | Ukuda | 524/497 |
| 6,778,240 B2 | 8/2004 | Nakamura et al. | 349/112 |
| 6,870,677 B2 | 3/2005 | Ohgane | 359/565 |
| 6,912,092 B2 | 6/2005 | Ukuda | 359/642 |
| 7,031,078 B2 | 4/2006 | Ukuda | 359/741 |
| 7,046,445 B2 | 5/2006 | Ukuda | 359/576 |
| 7,196,132 B2 | 3/2007 | Ukuda | 524/497 |
| 2001/0015848 A1 | 8/2001 | Nakai et al. | 359/565 |
| 2001/0038503 A1 | 11/2001 | Nakai | 359/869 |
| 2003/0180563 A1 | 9/2003 | Ukuda et al. | 428/515 |
| 2003/0197941 A1 | 10/2003 | Ohgane | 359/558 |
| 2003/0231396 A1 | 12/2003 | Nakai | 359/569 |
| 2004/0042102 A1 | 3/2004 | Ukuda | 359/883 |
| 2004/0051949 A1 | 3/2004 | Ukuda | 359/576 |
| 2005/0190459 A1 | 9/2005 | Ukuda | 359/708 |
| 2006/0272942 A1* | 12/2006 | Sirringhaus | 204/406 |
| 2009/0052040 A1 | 2/2009 | Suzuki et al. | |
| 2009/0190224 A1* | 7/2009 | Iwasa | 359/576 |

FOREIGN PATENT DOCUMENTS

| | | |
|---|---|---|
| EP | 0 544 008 | 6/1993 |
| EP | 0 895 099 A2 | 2/1999 |
| EP | 0 895 100 | 2/1999 |
| EP | 1 065 531 A2 | 1/2001 |
| JP | 58-162617 | 9/1983 |
| JP | 61-9262 B2 | 3/1986 |
| JP | 3-191319 | 8/1991 |
| JP | 04-366115 | 12/1992 |
| JP | 06-16450 | 1/1994 |
| JP | 6-16720 | 1/1994 |
| JP | 6-032631 | 2/1994 |
| JP | 9-127321 | 5/1997 |
| JP | 9-127322 | 5/1997 |
| JP | 10-268116 | 10/1998 |
| JP | 11-44808 | 2/1999 |
| JP | 11-44810 | 2/1999 |
| JP | 2000-98118 | 4/2000 |
| JP | 2005-336247 A | 12/2005 |
| WO | WO 98/45108 | 10/1998 |
| WO | WO 00/49465 A1 | 8/2000 |
| WO | 2006/090614 A1 | 8/2006 |

OTHER PUBLICATIONS

A.D. Kathman and S.K. Pitalo, "Binary Optics in Lens Design," International Lens Design Conference, SPIE vol. 1354, Jun. 1990, pp. 297-309.

Michael W. Farn, et al., "Diffractive Doublet Corrected On-Axis at Two Wavelengths," *SPIE* vol. 1354, Jun. 1990, pp. 24-29.

Carmiña Londoño, et al., "The Design of Achromated Hybrid Diffractive Lens Systems," SPIE vol. 1354, Jun. 1990, pp. 30-37.

A.P. Wood, "Using Hybrid Refractive-Diffractive Elements in Infrared Petzval Objectives," International Lens Design Conference, *SPIE* vol. 1354, pp. 316-322 (1990).

B. Kippelen, et al., "New Highly Efficient Photorefractive Polymer Composite for Optical-Storage and Image-Processing Applications," *Electronic Letters* vol. 29, No. 21, Oct. 1993, pp. 1873-1874.

Ivan D. Nikolov, et al., "Optical Plastic Refractive Measurements in the Visible and Near-Infrared Regions," Applied Optics, vol. 39, No. 13, May 2000, pp. 2067-2070.

Chinese Chemical Dictionary, p. 512 (Aug. 2000) (w/ partial English Translation).

European Search Report in European Patent Application No. 0 325 1188.3 (Jun. 2003).

* cited by examiner

OPTICAL MATERIAL AND OPTICAL ELEMENT, DIFFRACTION OPTICAL ELEMENT, AND STACKED TYPE DIFFRACTION OPTICAL ELEMENT MOLDED THEREOF

BACKGROUND OF THE INVENTION

1. Field of the Invention

The present invention relates to an optical material and optical element, diffraction optical element, and stacked type diffraction optical element molded of the optical material.

2. Description of the Related Art

Conventionally, refraction optical systems which use refraction of light to reduce chromatic aberration do so by using a combination of lenses made of glass material with different dispersion characteristics. For example, in a telescope, chromatic aberration which occurs on an axis of an object lens is corrected using a combination of positive lenses made of high-dispersion glass material and negative lenses made of low-dispersion glass material. However, it is sometimes difficult to correct chromatic aberration sufficiently if there are limits on the configuration or number of lenses or on available glass materials.

A. D. Kathman and S. K. Pitalo disclose in "Binary Optics in Lens Design." International Lens Design Conference, 1990, SPIE Vol. 1354, pp. 297-309 that the combined use of refractive optical elements which have a reflection plane and diffraction optical elements which have a diffraction grating allows chromatic aberration to be reduced using a small number of lenses.

This uses a physical phenomenon in which chromatic aberrations caused by a light beam of a reference wavelength are opposite in direction between a reflection plane and refraction plane of an optical element. Also, if a period of a diffraction grating continuous with a diffraction optical element is changed, characteristics equivalent to those of an aspherical lens are available.

However, a light beam incident on the diffraction optical element is divided by diffraction effects into multiple lights of different orders. At this time, diffracted lights of orders other than a designed order are focused on locations different from light of the designed order, causing flare.

U.S. Pat. No. 5,847,877 discloses a technique for achieving high diffraction efficiency over a wide range of wavelengths by optimizing optical dispersion of optical elements and shape of a grating formed on boundaries among the optical elements. The technique concentrates light fluxes in a usable wavelength range on a particular order, thereby reducing intensities of irrelevant diffracted lights (designed order) and thereby preventing flare.

U.S. Pat. No. 5,847,877 also discloses combined use of diffraction optical elements made of a material with optical scatteringlow dispersion and diffraction optical elements made of a material with optical scatteringhigh dispersion to provide a configuration which has high diffraction efficiency over a wide range of wavelengths.

That is, the larger the difference in optical dispersion between a material with optical scatteringlow dispersion and material with optical scatteringhigh dispersion, the higher the diffraction efficiency of the resulting optical element and the wider the field angle of the optical element. Thus, to correct chromatic aberration with high accuracy, it is necessary to combine a material having higher dispersion (smaller Abbe's number) with a material having lower dispersion (larger Abbe's number).

U.S. Pat. No. 6,912,092 discloses an optical material wherein a relationship between a refractive index (nd) and Abbe's number (vd) with respect to line n is given by $nd > -6.667 \times 10^{-3} vd + 1.70$ and a relationship between a secondary dispersion ($\theta g, F$) and the Abbe's number (vd) is given by $\theta g, F \leq -2 vd \times 10^{3} + 0.59$. If the equations are satisfied, the diffraction efficiency can be improved over an entire visible region. The optical material disclosed in U.S. Pat. No. 6,912,092 is a compound material produced by mixing and dispersing fine particles in an organic resin serving as a base. The fine particles are made of transparent conductive metal oxide with high dispersion and low secondary dispersion characteristics. Possible transparent conductive metal oxides which are disclosed include ITO, ATO, $SnO_2$, and ZnO.

However, with a compound material of fine particles and resin, optical scattering occurs at interfaces between the fine particles and resin. Generally, optical scattering (Rayleigh scattering) increases in direct proportion to the sixth power of particle size, the fourth power of the inverse of wavelength, and a reflection coefficient (a ratio of a refractive index). Fine particles of metal oxides such as ITO often have a larger reflection coefficient than organic resin which serves as a base, resulting in a large ratio of reflection coefficient between the metal oxides and base. Consequently, it is necessary to reduce the optical scattering.

With a compound of fine particles of a metal oxide and organic resin which serves as the base, to reduce optical scattering, it is necessary to reduce the particle size at least below the wavelength of the light to be used. However, agglomeration of fine particles of metal oxides increases with decreases in the particle size due to van der Waals forces. This increases apparent particle size, resulting in intense optical scattering.

Furthermore, to reduce optical scattering, it is desirable to minimize particle size distribution of each type of fine particle and to make physical properties of each type uniform whenever possible. However, manufacture of fine particles of metal oxides is very demanding. Slight differences in manufacturing conditions can cause oxygen deficiency in the metal oxides and affect the degree of crystallinity. These changes in turn affect the shape and physical properties of the fine particles, making it very difficult to keep the particle size and physical properties of the fine particles uniform.

SUMMARY OF THE INVENTION

An object of the present invention is to provide an optical material which causes reduced optical scattering, the optical material having low dispersion characteristics and secondary dispersion characteristics equivalent to those of a compound in which fine particles of a conductive metal oxide such as ITO are dispersed in an organic resin.

By adding fine particles of a conductive polymer to an organic resin which serves as a base so that the fine particles of the conductive polymer will be dispersed in the organic resin, the inventor provides an optical material which satisfies the relationship $\theta g, F \leq -2 vd \times 10^{-3} + 0.59$, where vd is an Abbe's number and "$\theta g, F$" is a secondary dispersion.

Possible conductive polymers according to the present invention include 3,4-ethylenedioxythiophene/polystyrenesulfonic acid (PEDOT/PSS).

The present invention provides a stacked type diffraction optical element, including: a diffraction grating which, being formed of a material with high dispersion, has a diffraction shape formed on one surface thereof; and a diffraction grating which, being formed of a material with low dispersion, has a diffraction shape formed on one surface thereof, wherein respective diffraction planes of the diffraction gratings are placed in opposing relation to each other, the high dispersion material includes fine particles of a conductive polymer material dispersed in an organic resin, and the Abbe's number and a secondary dispersion meet a relation: $\theta g, F \leq -2vd \times 10^{-3} + 0.59$.

The above and other objects of the invention will become more apparent from the following drawings taken in conjunction with the accompanying drawings.

DESCRIPTION OF THE EMBODIMENTS

Figure 1:
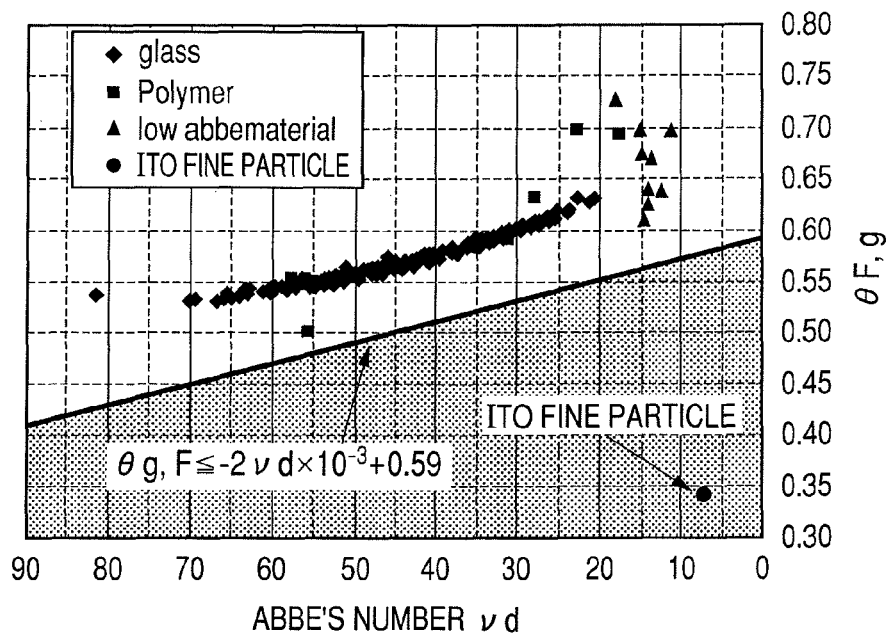
FIG. 1 is a graph illustrating a relationship between Abbe's number and secondary dispersion characteristics.

FIG. 1 is a graph illustrating a relationship between Abbe's number and secondary dispersion characteristics of commercially available typical optical materials and an optical material which uses a transparent conductive metal oxide disclosed in U.S. Pat. No. 6,059,411. In FIG. 1, the ordinate represents a secondary dispersion ($\theta g, F$) and the abscissa represents an Abbe's number ($vd$). It can be seen from FIG. 1 that the secondary dispersion of the typical optical materials excluding the transparent conductive metal oxide satisfies $\theta g, F \leq -2vd \times 10^{-3} + 0.59$.

The Abbe's number $vd$ is given by $vd = (nd-1)/(nF-nC)$ where $nd$ is the refractive index at a wavelength of 587.6 nm, $nF$ is the refractive index at a wavelength of 486.1 nm, $nC$ is the refractive index at a wavelength of 656.3 nm, and $ng$ is the refractive index at a wavelength of 435.8 nm.

The refractive index of light in an optical element changes more sharply with decreases in the wavelength, resulting in increased differences from designed refractive index. Thus, the shorter the wavelength, the lower the diffraction efficiency at a designed order. Such sharp changes in wavelength dispersion of a substance are attributable to the secondary dispersion of the refractive index given by $(\theta g, F) = (ng-nF)/(nF-nC)$. The smaller the secondary dispersion of the refractive index ($\theta g, F$), the higher the diffraction efficiency. Thus, it is necessary to satisfy $\theta g, F \leq -2vd \times 10^{-3} + 0.59$.

The present invention provides an optical material in which fine particles of a conductive polymer material are dispersed in an organic resin which serves as a base. The secondary dispersion of the optical material satisfies $\theta g, F \leq -2vd \times 10^{-3} + 0.59$. Consequently, the optical material causes reduced optical scattering, having excellent optical dispersion characteristics and secondary dispersion characteristics equivalent to those of a compound in which fine particles of a conductive metal oxide such as ITO are dispersed in an organic resin.

The refractive index of an organic conductive polymer is smaller than the refractive index of fine particles of a metal oxide, making it easy to select a material whose refractive index is close to the refractive index of the base resin. Thus, optical scattering can be reduced greatly. Desirably, the difference in the refractive index between the fine particles of the organic conductive polymer and the organic resin falls within a range of ±0.05.

Also, fine particles of an organic conductive polymer are easy to disperse, but hard to agglomerate, in an organic resin serving as a base because both the organic resin and fine particles are organic substances and have affinity to each other. Thus, a conductive substance can be colloidally dispersed at high concentrations in an organic resin, thereby reducing optical scattering.

Generally, fine particles of conductive polymer are not regarded to be difficult to compose and refine in terms of manufacturing equipment and material types. Therefore, the fine particles of conductive polymers have higher reproducibility of physical properties than fine particles of metal oxides whose physical properties are affected greatly by oxygen deficiency or the degree of crystallinity.

(Fine Particles of Organic Conductive Polymer)

Desirably, fine particles of an organic conductive polymer have a refractive index close to the refractive index of the organic resin serving as a base. Thus, poly Thiophene type polymer material can be used as the organic conductive polymer for the fine particles. Especially, poly 3,4-ethylenedioxythiophene/polystyrenesulfonic acid (PEDOT/PSS) is most suitable.

Also, it is desirable that an average diameter of the fine particles of the organic conductive polymer is in a range of 2 to 300 nm. If the average diameter of the fine particles is less than 2 nm, it is difficult to produce the fine particles. On the other hand, an average diameter larger than 300 nm has a problem because agglomeration and the like can cause optical scattering. Besides, one organic conductive polymer or a combination of two or more organic conductive polymers may be used depending on required characteristics.

Desirably, content of the fine particles of the organic conductive polymer in the organic resin serving as the base is between 0.03% and 60.0% by weight. When the content is lower than 0.03% by weight, sufficient secondary dispersion characteristics cannot be obtained. Also, organic conductive polymers are often colored, and a content higher than 60.0% by weight will make it difficult to ensure transmittance of fabricated optical elements.

The fine particles of the organic conductive polymer are mixed into the base resin, being dispersed in a solvent. Examples of the dispersing solvent used to dissolve the organic resin serving as the base or to keep the fine particles of the organic conductive polymer dispersed in the solvent include, but not limited to, water; aromatic hydrocarbons such as toluene, benzene, and xylene; alcohols such as ethanol and isopropanol; alicyclic hydrocarbons such as cyclohexane; acetic esters such as ethyl acetate and butyl acetate; ketones such as acetone and methyl ethyl ketone; amides such as DMF, DMAc, and NMP; aliphatic hydrocarbons such as hexane and octane; ethyls such as ether and butyl carbitol; and halogenated hydrocarbons such as dichloromethane and carbon tetrachloride. The organic solvent can be selected according to the fine particles of the organic conductive polymer to be used. A single organic solvent may be used alone, but two or more organic solvents may be used in combination as long as dispersivity is maintained.

(Organic Resin Serving as the Base)

The organic resin serving as the base may be any of a polymer, oligomer, and monomer, and the type of polymerization such as photo polymerization and thermal polymerization is not limited. Suitable organic resins include acrylic resins, methacrylic resins, vinyl resins, polyester resins, polyamide resins, urethane resins, CAB resins, melamine resins, and epoxy resins. One of the above-mentioned resins may be used alone or two or more resins may be used in combination. However, acrylic resins, methacrylic resins, vinyl resins, or a mixture of unsaturated ethylene groups thereof is desirable from the viewpoint of transparency, compatibility, dispersibility, hardenability, moldability, and durability.

(Photo-Polymerization Initiator)

When a photo-polymerizable resin is used as the organic resin serving as the base, a radical formation mechanism based on exposure to light can be used with a radical polymerization initiator being used as a photo-polymerization initiator. Generally, this is suitable for replication of lenses and the like. Available photo-polymerization initiators include 2-benzyl-2-dimethylamino-1-(4-morpholinophenyl)-1-butanone, 1-hydroxy-cyclohexyl-phenylketone, 2-hydroxy-2-methyl-1-phenyl-propane-1-on, bis(2,4,6-trimethylbenzoyl)-phenylphosphineoxide, 4-phenylbenzophenone, 4-phenoxybenzophenone, 4,4'-diphenylbenzophenone, and 4,4'-diphenoxybenzophenone.

A proportion of the photo-polymerization initiator to the organic resin serving as the base can be determined as required according to exposure dose and additional heating temperature or adjusted according to desired average molecular weight of a resulting polymer. For resin hardening and molding according to the present invention, a desirable proportion of the photo-polymerization initiator to be added to the resin is between 0.01% and 10.00% by weight although it varies depending on amounts of the added fine particles of the organic conductive polymer, which absorbs visible light. A single photo-polymerization initiator or a combination of two or more photo-polymerization initiators may be used depending on reactivity to the organic resin serving as the base.

(Thermal-Polymerization Initiator)

When a thermally polymerizable resin is used as the organic resin serving as the base, a radical formation mechanism based on heating can be used with a radical polymerization initiator being used as a thermal-polymerization initiator. Generally, this is suitable for replication of lenses and the like. When the thermally polymerizable resin is used, available thermal-polymerization initiators include, for example, azobisisobutyronitrile (AIBN), benzoylperoxide, t-butylperoxypivalate, t-butylperoxyneohexanoate, t-hexylperoxyneohexanoate, t-butylperoxyneodecanoate, t-hexylperoxyneodecanoate, cumyl peroxyneohexanoate, and cumyl peroxyneodecanoate.

A proportion of the thermal-polymerization initiator to the organic resin serving as the base can be determined as required according to heating temperatures and to amounts of oxygen present during molding. Also, two or more initiators may be used in combination. Besides, the proportion may be adjusted according to a desired degree of polymerization of a resulting item. A desirable proportion of the thermal-polymerization initiator to be added to the resin is between 0.01% and 10.00% by weight. A single thermal-polymerization initiator or a combination of two or more thermal-polymerization initiators may be used depending on reactivity to the organic resin serving as the base.

(Fabrication Process of Optical Material)

Next, a preparation process of the optical material using a resin, a polymerization initiator, fine particles of an organic conductive polymer, and a dispersing solvent will be described. A case in which a photo-polymerizable resin is used as the organic resin serving as the base will be described representatively.

First, the fine particles of the organic conductive polymer are colloidal dispersed in the solvent, in which the selected photo-polymerizable resin and a photo-polymerization initiator are dissolved. In so doing, it is desirable to combine the solvent and the fine particles of the organic conductive polymer with a resin which will least obstruct the dispersion of the fine particles of the organic conductive polymer.

Once the substances are dissolved completely, after making sure that the fine particles of the organic conductive polymer are dispersed properly without precipitation, the solvent is removed using an evaporator. In so doing, it is desirable to adjust the extent of pressure reduction according to the boiling point of the solvent and amount of residual solvent. Abrupt evaporation or removal of the solvent may worsen the degree of agglomeration of the fine particles of the organic conductive polymer, and thereby impair dispersibility. Also, during removal of the solvent by means of pressure reduction, the solvent may be heated as required within the bounds of not impairing the dispersibility. The optical material according to the present invention is obtained in this way. The optical material thus obtained may contain residual solvent which cannot be removed completely, and durability and optical properties of resulting moldings may be affected depending on content of the residual solvent. Thus, it is desirable that the content of the residual solvent is between 0.01% and 0.50% by weight of total weight excluding the weight of the solvent.

If the pressure reduction is excessive, if the pressure reduction involves heating, or if a pressure reduction process runs for an extended period of time, a dispersant added together with the solvent as well as monomers and the like included in the organic resin serving as the base could be removed as well. Thus, it is necessary to adjust the extent of pressure reduction, temperatures, and time by taking into consideration the molecular weight, boiling point, and sublimability of individual substances.

(Molding of Diffraction Optical Element)

A process for producing a die-formed layer from the optical material using a photo-polymerization method in a process for molding a diffraction optical element will be described next. To form a thin-film layer structure on an optically transparent material for use as a substrate, a flat glass plate, for example, is used for the substrate. On the other hand, a metallic material is used for a die which accommodates a fine diffraction grating structure. Die forming involves pouring the optical material which exhibits fluidity between the flat glass plate and die and lightly pressing thereon. Photo-polymerization is carried out while maintaining this state. Light of a suitable wavelength, which normally is ultraviolet light or visible light, is used for light exposure in such photo-polymerization reactions to support the mechanism for radical formation by means of the photo-polymerization initiator. For example, monomers and other ingredients for preparation of the optical material are uniformly exposed to light through the optically transparent material used as the substrate, specifically, the flat glass plate. Quantity of light used for the exposure is determined as required according to the mechanism for radical formation by means of the photo-polymerization initiator or content of the photo-polymerization initiator.

On the other hand, in the production of a die-formed layer of the optical material by means of photo-polymerization reactions, it is desirable that monomers and other ingredients poured into the die are uniformly exposed to light. Thus, it is desirable to select a light of such a wavelength as to allow uniform exposure through the optically transparent material used as the substrate, specifically, the flat glass plate. For that, it is more appropriate according to the present invention to decrease total thickness of the diffraction grating including the die-formed body of the optical material on the optically transparent material for use as the substrate. Similarly, a thermal-polymerization method may be used for production of the die-formed layer as well. In that case, it is desirable to keep overall temperature uniform, and it is more appropriate according to the present invention to decrease total thickness of the diffraction grating including the die-formed body of the optical material on the optically transparent material for use as the substrate.

The use of the optical material according to the present invention in conjunction with one of the methods described above allows the diffraction optical element to be produced in a short time, where the diffraction optical element is produced by stacking multiple layers of materials with different light wavelength dispersions on a substrate and is designed to have high diffraction efficiency of a particular order (designed order) over an entire usable wavelength range. Also, a release agent, sensitizing agent, stabilizing agent, and thickening agent may be added.

Examples of the present invention will be described below, but the present invention is not limited by those examples in any way. Refractive indices were measured using an ellipsometer (manufactured by J. A. Woollam Co., Inc.), scattering rates were measured using spectrophotometer U-4000 (manufactured by Hitachi, Ltd.), and particle sizes were measured using Zetasizer ZS (manufactured by Sysmex Corp.).

EXAMPLE 1

Figure 3:
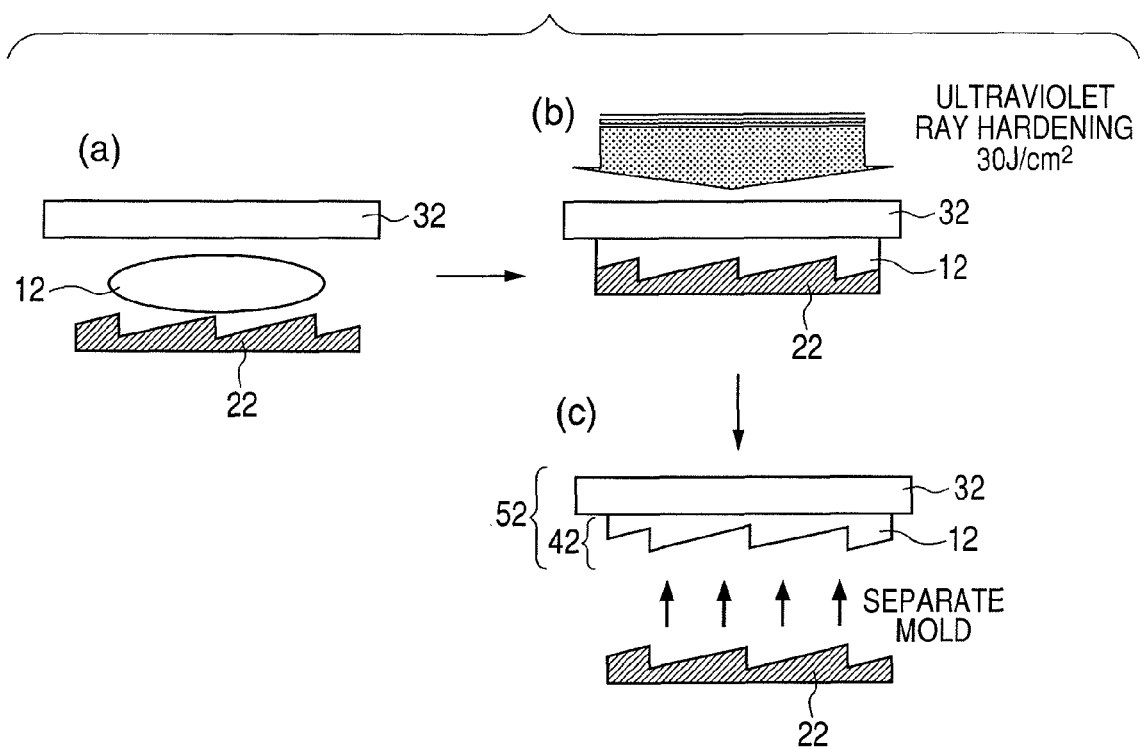
FIG. 3 is a sectional view illustrating the molding process of the optical element according to example 1.
Figure 4:
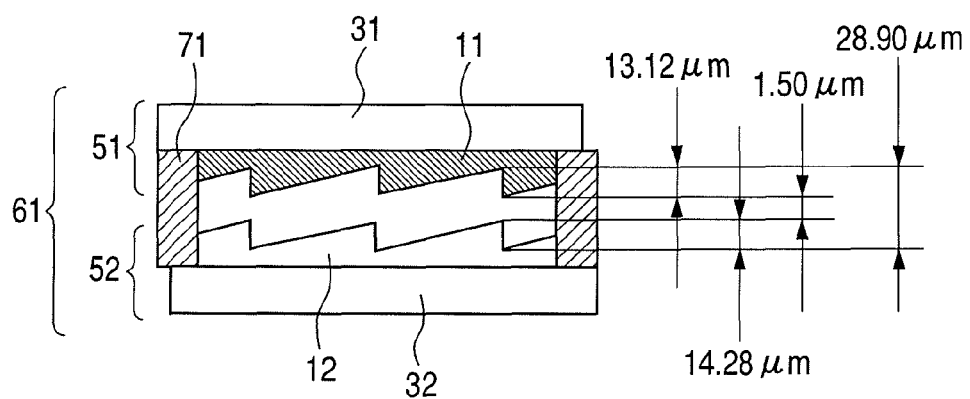
FIG. 4 is a sectional view illustrating a structure of a stacked type diffraction optical element according to example 1.

A configuration and fabrication method of a stacked type diffraction optical element according to example 1 will be described with reference to (a), (b) and (c) of FIG. 2, FIGS. 3 and 4. First, 10.00 g of 1-vinyl-2-pyrrolidone (whose refractive index is 1.523) and 0.31 g of 1-hydroxycyclohexylphenylketone serving as an optical initiator were added to a 45.00 g of a water solution containing 1.30 wt % of colloidally dispersed fine particles of a conductive polymer, namely PEDOT/PSS (manufactured by Aldrich Co.; product No.: 48309-5 & 56059-6; average diameter: 80 nm; refractive index: 1.529 (listed value)). The mixture was stirred using a stirrer to facilitate dispersion and dissolution. Subsequently, the solvent was removed under reduced pressure, and thus an optical material 11 was prepared.

Figure 2:
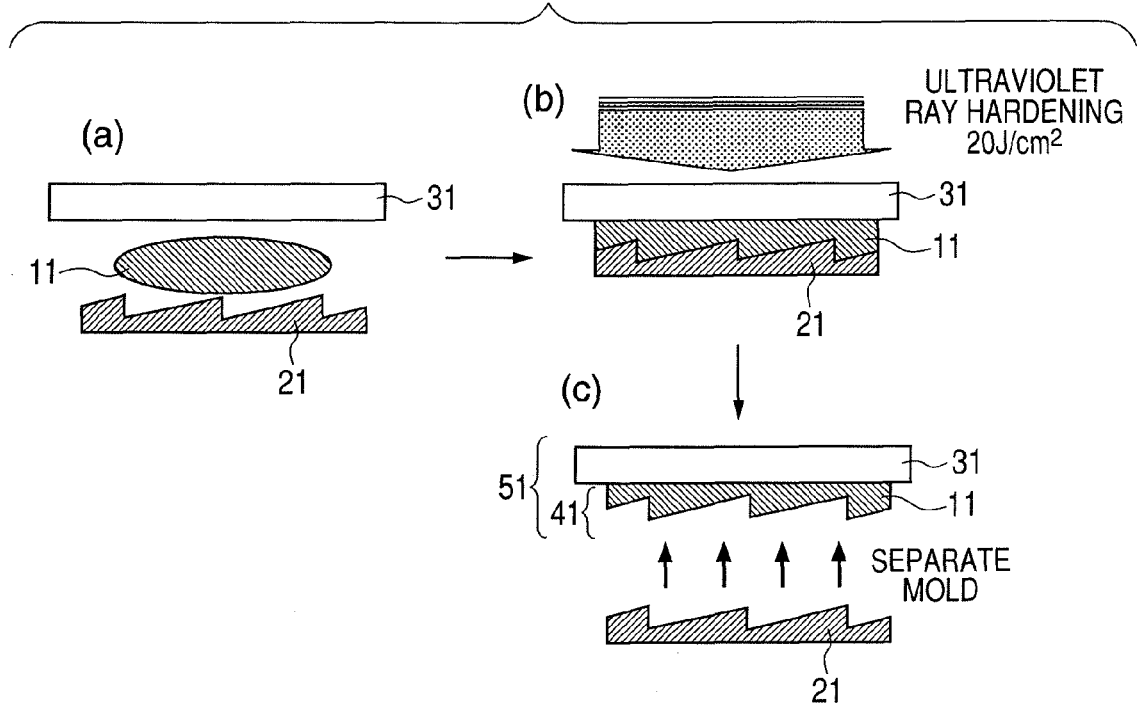
FIG. 2(a), (b) and (c) are sectional views illustrating a molding process of an optical element according to example 1. views illustrating a molding process of an optical element according to example 1.

Next, as illustrated in (a) of FIG. 2, the optical material 11 was supplied to a die 21 formed into a shape of a diffraction grating for this example. Then, as illustrated in (b) of FIG. 2, a flat glass plate 31 (manufactured by SCHOTT GLAS GmbH; trade name: BK7; hereinafter abbreviated to BK7) was placed on the optical material 11 and exposed to light under a condition of 20 J/cm$^2$ (40 mW/cm$^2$) using a UV light source (EX250 manufactured by HOYA-SCHOTT Corp.). Subsequently, as illustrated in (c) of FIG. 2, a hardened optical element 41 was removed from the die 21, and thus a diffraction optical element 51 was produced. Optical characteristics of the optical material 11 of the optical element 41 were as follows: nd=1.5269; vd=26.75; θg,F=0.452. The optical characteristics satisfy $\theta g, F \leq -2vd \times 10^{-3} + 0.59$.

On the other hand, to fabricate another optical element, an optical material 12 was prepared using photo hardening resin RC-C001 (manufactured by Dainippon Ink and Chemicals Inc.). Optical characteristics of RC-C001 are as follows: nd=1.5228 and vd=51.42. Next, as illustrated in FIG. 3A, the optical material 12 was supplied to a die 22 formed into a shape of a diffraction grating for this example. Then, as illustrated in FIG. 3B, a flat glass plate (BK7) 32 was placed on the optical material 12 and exposed to light under a condition of 30 J/cm$^2$ (40 mW/cm$^2$) using the UV light source (EX250 manufactured by HOYA-SCHOTT Corp.). Subsequently, as illustrated in FIG. 3C, a hardened optical element 42 was removed from the die 22, and thus a diffraction optical element 52 was produced.

Next, anti-reflection films were formed on diffraction planes of the diffraction optical element 51 and diffraction optical element 52 by typical vapor deposition. Then, as illustrated in FIG. 4, a stacked type diffraction optical element 61 was produced by combining the diffraction optical elements 51 and 52 in such a way that the respective diffraction planes would face each other to form a gap therebetween. A spacer 71 was used to establish spacing between the diffraction optical element 51 and diffraction optical element 52. Grating pitches of both the diffraction optical element 51 and diffraction optical element 52 were 80.00 μm. Distance between the diffraction gratings of the diffraction optical element 51 and diffraction optical element 52 was 28.90 μm valley-to-valley, and 1.50 μm peak-to-peak. The peak of the diffraction optical element 51 was 13.12 μm high and the peak of the diffraction optical element 52 was 14.28 μm high.

Figure 5:
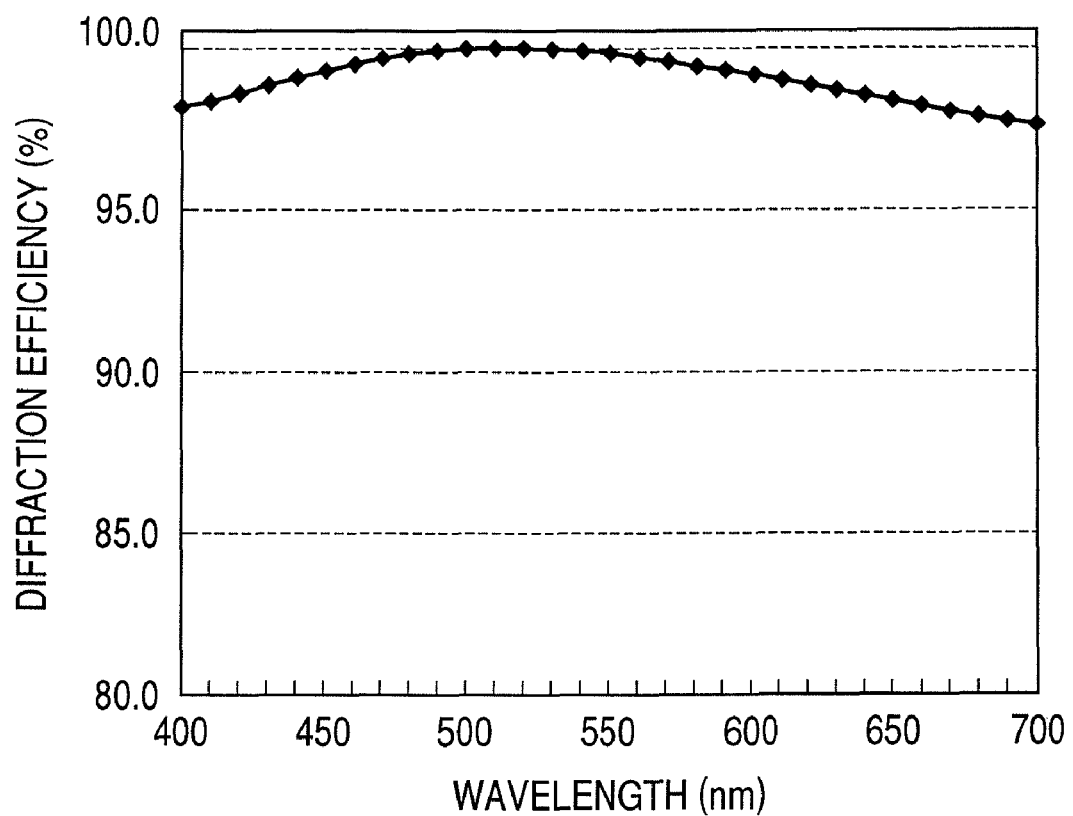
FIG. 5 is a graph illustrating a first order diffraction intensity of the stacked type diffraction optical element according to example 1.

FIG. 5 is a graph illustrating intensity of first order diffracted light of the fabricated stacked type diffraction optical element 61 at an incident angle of 0° plotted against wavelength (400 nm to 700 nm), where the abscissa represents the wavelength and the ordinate represents diffraction efficiency. In FIG. 5, the diffraction efficiency is 98.9% at a wavelength of 430 nm, 100.0% at a wavelength of 500 nm, and 97.6% at a wavelength of 700 nm. Thus, the diffraction efficiency of the stacked type diffraction optical element 61 is higher than 97% over the entire usable wavelength range, resulting in a relatively good intensity wavelength distribution.

The first order diffracted light was calculated using a typical method which involves measuring diffraction efficiency by comparing transmittance between a film with a diffraction grating and film without a diffraction grating, where the two films were equal in average film thickness.

EXAMPLE 2

An optical material 13 was prepared using the same method as example 1 except that the amount of the water solution with a colloidal dispersion was 65.00 g.

Also, using a die formed into a shape of a diffraction grating for this example and a flat glass plate 33, a diffraction optical element 53 was fabricated by the same molding method as example 1. Optical characteristics of the optical material 13 were as follows: nd=1.5249; vd=22.29; θg,F=0.422. The optical characteristics satisfy θg,F≦−2vd×$10^{-3}$+0.59 and θg,F≦0.45.

On the other hand, to fabricate another optical element, a diffraction optical element 54 was fabricated using a die formed into a shape of a diffraction grating for this example and a flat glass plate 34. The optical material 12 used was the same as in example 1 and optical characteristics of the optical material 12 were as follows: nd=1.5228 and vd=51.42.

Figure 6:
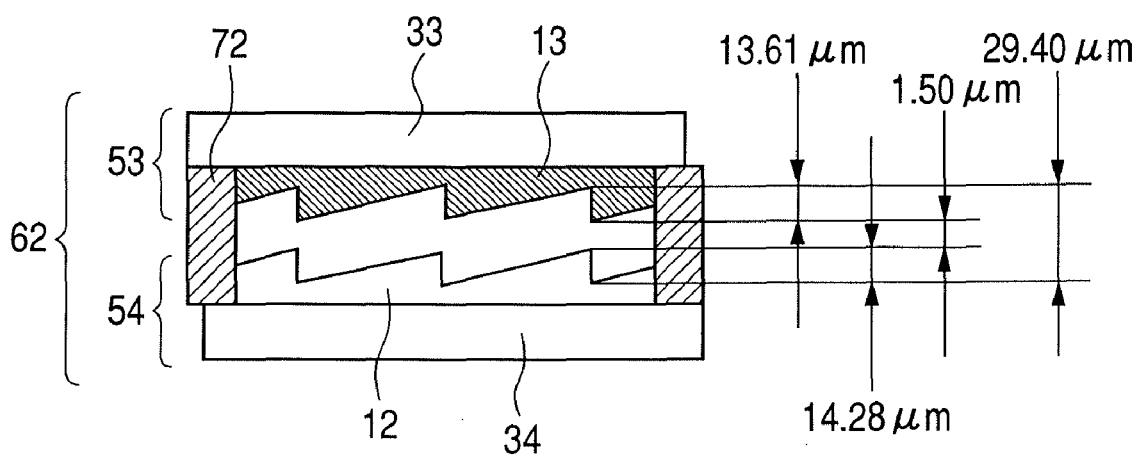
FIG. 6 is a sectional view illustrating a structure of a stacked type diffraction optical element according to example 2.

Next, anti-reflection films were formed on diffraction planes of the diffraction optical element 53 and diffraction optical element 54. Then, as illustrated in FIG. 6, a stacked type diffraction optical element 62 was produced by combining the diffraction optical elements 53 and 54 in such a way that the respective diffraction planes would face each other to form a gap therebetween. A spacer 72 was used to establish spacing between the diffraction optical element 53 and diffraction optical element 54. Grating pitches of both the diffraction optical element 53 and diffraction optical element 54 were 80.00 μm. Distance between the diffraction gratings of the diffraction optical element 53 and diffraction optical element 54 was 29.40 μm valley-to-valley, and 1.50 μm peak-to-peak. The peak of the diffraction optical element 53 was 13.61 μm high and the peak of the diffraction optical element 54 was 14.28 μm high.

Figure 7:
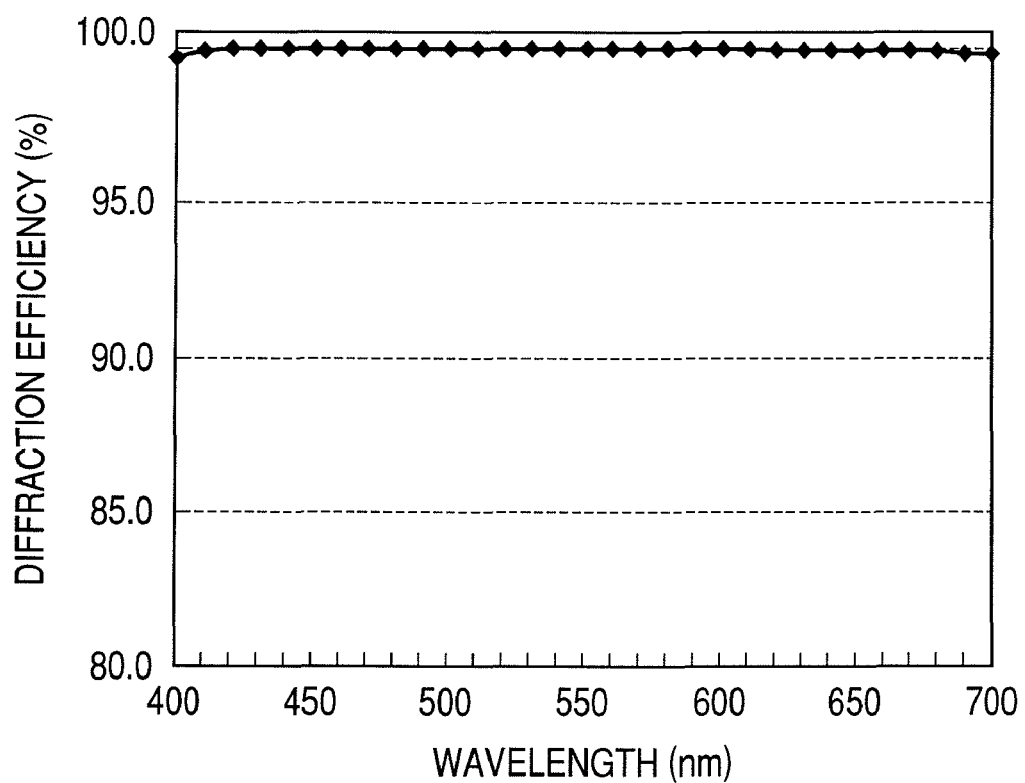
FIG. 7 is a graph illustrating a first order diffraction intensity of the stacked type diffraction optical element according to example 2.

FIG. 7 is a graph illustrating intensity of first order diffracted light of the fabricated stacked type diffraction optical element 62 at an incident angle of 0° plotted against wavelength (400 nm to 700 nm), where the abscissa represents the wavelength and the ordinate represents diffraction efficiency. In FIG. 7, the diffraction efficiency is 100.0% at a wavelength of 430 nm, 100.0% at a wavelength of 500 nm, and 99.9% at a wavelength of 700 nm. Thus, the diffraction efficiency of the stacked type diffraction optical element 62 is higher than 99% over the entire usable wavelength range, resulting in a far better intensity wavelength distribution than in example 1.

COMPARATIVE EXAMPLE 1

A configuration and fabrication method of a stacked type diffraction optical element according to comparative example 1 will be described next. In comparative example 1, an optical material 14 was used instead of the optical material 11 used in example 1. Optical characteristics of the optical material 14 were as follows: nd=1.6694; vd=19.16; θg,F=0.687. The optical material 14 was prepared by mixing and dissolving 9.00 g of vinylcarbazole, 1.00 g of polyvinylcarbazole, 1.76 g of divinylbenzene, and 0.36 g of Irgacure 184 (manufactured by Chiba Specialty Chemicals Co., Ltd.). The optical characteristics of the material do not satisfy θg,F≦−2vd×$10^{-3}$+0.59 and θg,F≦0.45.

Using a die formed into a shape of a diffraction grating for this comparative example and a flat glass plate 35, a diffraction optical element 55 was fabricated by the same molding method as example 1.

On the other hand, to fabricate another optical element, a diffraction optical element 56 was fabricated using a die formed into a shape of a diffraction grating for this comparative example and a flat glass plate 36. The optical material 12 used was the same as in example 1 and optical characteristics of the optical material 12 were as follows: nd=1.5228 and vd=51.42.

Figure 8:
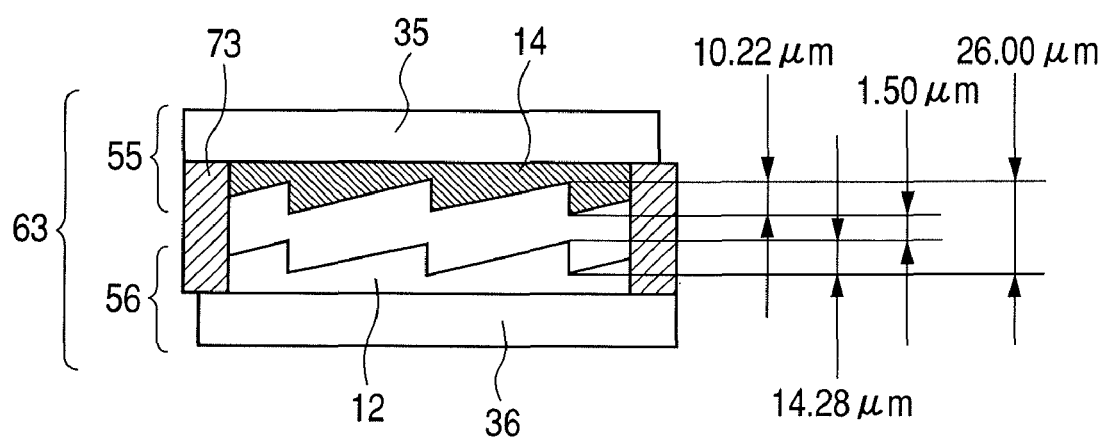
FIG. 8 is a sectional view illustrating a structure of a stacked type diffraction optical element according to comparative example 1.

Next, anti-reflection films were formed on diffraction planes of the diffraction optical element 55 and diffraction optical element 56. Then, as illustrated in FIG. 8, a stacked type diffraction optical element 63 was produced by combining the diffraction optical elements 55 and 56 in such a way that the respective diffraction planes would face each other to form a gap therebetween. A spacer 73 was used to establish spacing between the diffraction optical element 55 and diffraction optical element 56. Grating pitches of both the diffraction optical element 55 and diffraction optical element 56 were 80.00 μm. Distance between the diffraction gratings of the diffraction optical element 55 and diffraction optical element 56 was 26.00 μm valley-to-valley, and 1.50 μm peak-to-peak. The peak of the diffraction optical element 55 was 10.22 μm high and the peak of the diffraction optical element 56 was 14.28 μm high.

Figure 9:
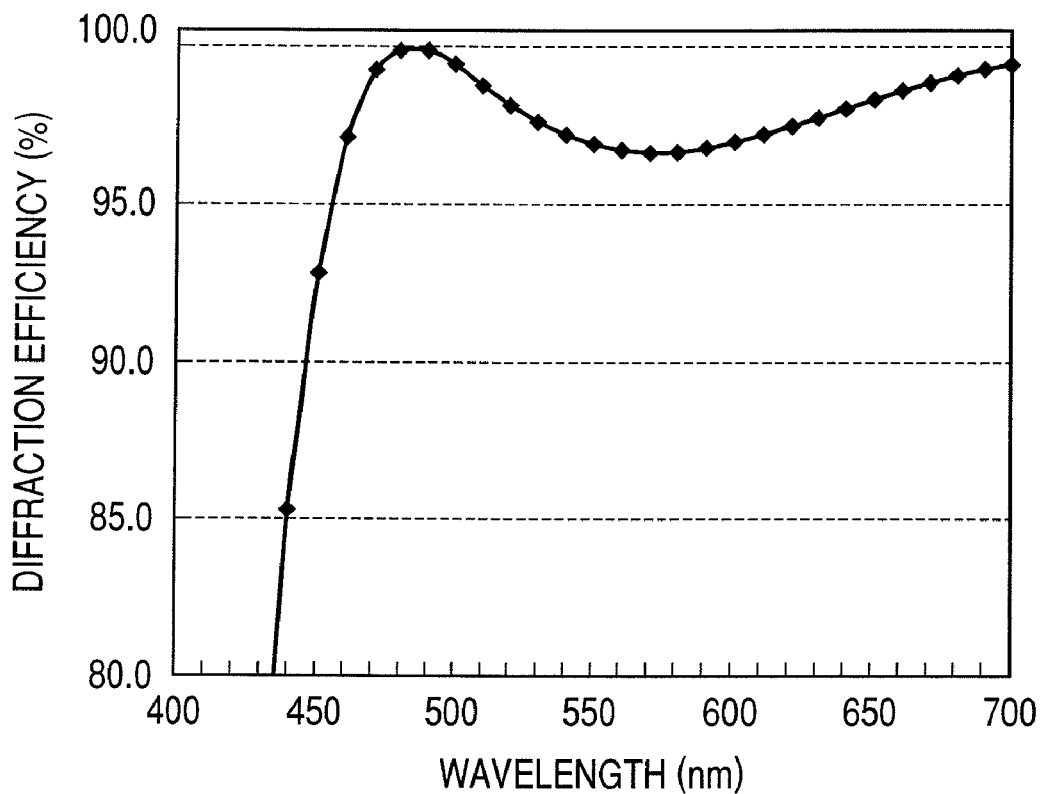
FIG. 9 is a graph illustrating a first order diffraction intensity of the stacked type diffraction optical element according to comparative example 1.

FIG. 9 is a graph illustrating intensity of first order diffracted light of the fabricated stacked type diffraction optical element 63 at an incident angle of 0° plotted against wavelength (400 nm to 700 nm), where the abscissa represents the wavelength and the ordinate represents diffraction efficiency. In FIG. 9, the diffraction efficiency is lower as a whole than the diffraction efficiencies of the stacked type diffraction optical elements in examples 1 and 2. The diffraction efficiency is considerably low especially at 400 to 470 nm and 550 to 600 nm.

COMPARATIVE EXAMPLE 2

In comparative example 2, an optical material 15 was used instead of the optical material 11 used in example 1. A configuration and fabrication method of a stacked type diffraction optical element according to comparative example 2 will be described. A xylene solution containing a dispersant was prepared by adding Disperbyk-180 (trade name of a dispersant manufactured by BYK-Chemie Japan KK) to a xylene solution so that the content of the dispersant will be 2.22% by weight. Next, fine ITO particles with an average diameter of 15 nm (listed value) was added and dispersed in the xylene solution so that the content of ITO will be 10.0% by weight. To 45.75 g of the resulting xylene solution containing the fine ITO particles, the following substances were added and dispersed: 1.50 g of Aronix M-6200 (trade name of a UV hardening resin manufactured by Toagosei Co., Ltd.), 0.75 g of tris(2-acryloxyethyl)isocyanurate, 0.75 g of pentaerythritol-triacrylate, 1.50 of dicyclopentenyloxyethylmethacrylate, and 0.09 g of 1-hydroxycyclohexylphenylketone. Subsequently, the solvent was removed under reduced pressure, and thus an optical material 15 was prepared.

Optical characteristics of the optical material 15 were as follows: nd=1.5655; vd=22.76; θg,F=0.440. The optical characteristics satisfy θg,F≦−2vd×$10^{-3}$+0.59.

Using a die formed into a shape of a diffraction grating for this comparative example and a flat glass plate 37, a diffraction optical element 57 was fabricated by the same molding method as example 1.

On the other hand, to fabricate another optical element, a diffraction optical element 58 was fabricated using a die formed into a shape of a diffraction grating for this comparative example and a flat glass plate 38. The optical material 12 used was the same as in example 1 and optical characteristics of the optical material 12 were as follows: nd=1.5228 and vd=51.42.

Figure 10:
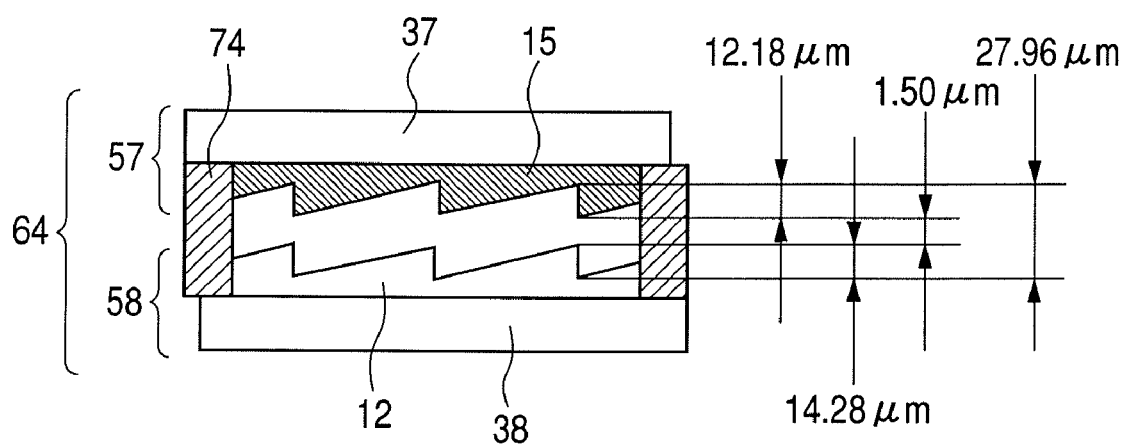
FIG. 10 is a sectional view illustrating a structure of a stacked type diffraction optical element according to comparative example 2.

Next, anti-reflection films were formed on diffraction planes of the diffraction optical element 57 and diffraction optical element 58. Then, as illustrated in FIG. 10, a stacked type diffraction optical element 64 was produced by combining the diffraction optical elements 57 and 58 in such a way that the respective diffraction planes would face each other to form a gap therebetween. A spacer 74 was used to establish spacing between the diffraction optical element 57 and diffraction optical element 58. Grating pitches of both the diffraction optical element 57 and diffraction optical element 58 were 80.00 μm. Distance between the diffraction gratings of the diffraction optical element 57 and diffraction optical element 58 was 27.96 μm valley-to-valley, and 1.50 μm peak-to-peak. The peak of the diffraction optical element 57 was 12.18 μm high and the peak of the diffraction optical element 58 was 14.28 μm high.

Figure 11:
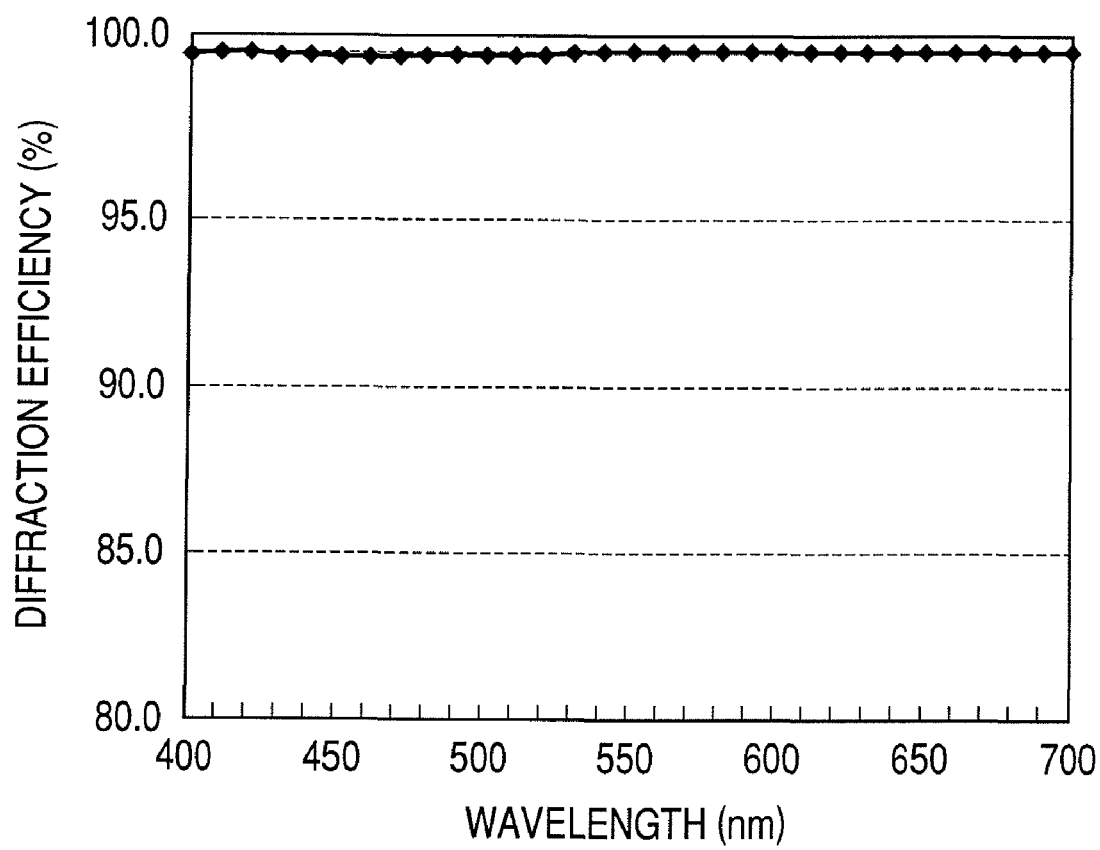
FIG. 11 is a graph illustrating a first order diffraction intensity of the stacked type diffraction optical element according to comparative example 2.

FIG. 11 is a graph illustrating intensity of first order diffracted light of the fabricated stacked type diffraction optical element 64 at an incident angle of 0° plotted against wavelength (400 nm to 700 nm), where the abscissa represents the wavelength and the ordinate represents diffraction efficiency. In FIG. 11, the diffraction efficiency is 99.9% at a wavelength of 430 nm, 99.9% at a wavelength of 500 nm, and 100.0% at a wavelength of 700 nm. Thus, the diffraction efficiency of the stacked type diffraction optical element 64 is higher than 99% over the entire usable wavelength range, resulting in a very good intensity wavelength distribution as in the case of example 2.

Physical properties of the optical materials obtained in examples 1 and 2 and comparative examples 1 and 2, measurements of optical scattering rates, evaluation of dispersion stability of the fine particles, and diffraction efficiencies of the first order diffracted light at an incident angle of 0° at different wavelengths (430 nm, 500 nm and 700 nm) are shown in Table 1. A film approximately 10 μm in thickness was prepared and used to measure the physical properties of the optical materials and optical scattering rates. To evaluate the dispersion stability of the fine particles, the prepared optical materials were stored in a cool, dark place for a fixed period of time and settling and agglomeration of the fine particles were compared among the optical materials based on changes in the optical scattering rates. Generally, the diffraction efficiency of a stacked type diffraction optical element is considered to be good if the diffraction efficiency is 99% or above. Thus, in this experiment, an evaluation of good or poor was given based on whether the diffraction efficiency is 99% or above over the entire visible region of 400 nm to 700 nm. Also, each of the optical materials 11, 13, 14 and 15 was marked with ○ if the optical element satisfied the condition of $\theta g, F \leq -2vd \times 10^{-3} + 0.59$, or marked with × if the optical element did not satisfy the condition.

Regarding the evaluation in terms of diffraction efficiency in Table 1, the optical element whose diffraction efficiency is 99% or above over the entire visible region is marked by ○, the optical element whose diffraction efficiency is from 95% (inclusive) to 99% (exclusive) is marked by Δ, and the optical element whose diffraction efficiency is less than 95% is marked by ×.

Also, to measure the optical scattering rates of the optical materials, 25-μm-thick film of each optical material was formed on a flat glass plate. Then, the optical scattering rates were measured. Regarding an evaluation criterion for the optical scattering rate in Table 1, the optical material whose maximum optical scattering rate was lower than 0.6% over the entire visible region was given ○, and the optical material whose maximum optical scattering rate was 0.6% or above was given ×. As for an evaluation criterion for the dispersion stability of fine particles, an evaluation of ○ was given if a change in the optical scattering rate after a storage in a dark place at room temperature and normal humidity for three months was less than 0.2%, and an evaluation of × was given if the change was 0.2% or above.

TABLE 1

|  | Example 1 | Example 2 | Comparative example 1 | Comparative example 2 |
| --- | --- | --- | --- | --- |
| Optical material | 11 | 13 | 14 | 15 |
| Diffraction optical element | 51 | 53 | 55 | 57 |
| Optical material | 15 | 12 | 12 | 12 |
| Diffraction optical element | 52 | 54 | 56 | 58 |
| Stacked type diffraction optical element | 61 | 62 | 63 | 64 |
| Diffraction efficiency [%] 430 nm | 98.9 | 100.0 | 73.6 | 99.9 |
| 500 nm | 100.0 | 100.0 | 99.4 | 99.9 |
| 700 nm | 97.6 | 99.9 | 99.4 | 100.0 |
| Diffraction efficiency: Good/Poor | Δ | ○ | × | ○ |
| Satisfies $\theta g, F \leq -2 \times 10^{-3} vd + 0.59$ | ○ | ○ | × | ○ |
| Abbe's number vd | 26.75 | 22.29 | 19.16 | 22.76 |
| Secondary dispersion θ g, F | 0.452 | 0.414 | 0.687 | 0.440 |
| Optical scattering rate [%] | 0.2 | 0.2 | 0.2 | 1.4 |
| Optical scattering rate after 3 months of storage [%] | 0.2 | 0.2 | 0.2 | 1.8 |
| Optical scattering rate: Good/Bad | ○ | ○ | ○ | × |
| Dispersion stability of fine particles: Good/Poor | ○ | ○ | — | × |
| Substance of fine particles | Organic substance (PEDOT/PSS) | Organic substance (PEDOT/PSS) | — | Inorganic substance (ITO) |

It can be seen from Table 1 that the stacked type diffraction optical elements 61, 62 and 64 made of the optical materials which satisfy $\theta g, F \leq -2vd \times 10^{-3} + 0.59$ in examples 1 and 2 and comparative examples 1 and 2 have relatively stable diffraction efficiencies over the entire visible region. In particular, the stacked type diffraction optical elements 62 and 64 constructed from diffraction optical elements made of the optical materials 13 and 15 which have an Abbe's number lower than 25 and satisfy $\theta g, F \leq -2vd \times 10^{-3} + 0.59$ have a diffraction efficiency higher than 99% over the entire visible region, indicating extreme stability.

However, in examples 1 and 2 and comparative example 1 which produced good results in the evaluation of diffraction efficiencies, although the optical materials 11, 13 and 15 satisfied $\theta g, F \leq -2vd \times 10^{-3} + 0.59$, the optical materials showed clear differences in the optical scattering rate.

In examples 1 and 2 in which the fine particles of the conductive polymer were dispersed, the optical materials 11 and 13 exhibited optical scattering rates as low as $\frac{1}{7}$ the optical scattering rate of the optical material 15 in comparative example 2 in which an inorganic substance of ITO was dispersed. It can be seen that the optical materials 11 and 13 in examples 1 and 2 in which organic fine particles were dispersed had optical scattering characteristics equivalent to optical scattering characteristics of the optical material 14 which did not contain fine particles. Also, it was confirmed that the optical materials 11 and 13 had particularly excellent dispersion stability: there was no change in the optical scattering rate, no precipitation of fine particles, and little change in the dispersion of the fine particles after three months or more in storage.

Also, reproducibility of optical properties of the optical materials was checked. By focusing on the molecular weight and fine particle size of PEDOT/PSS used in the examples, the processes from the fabrication of fine particles to the preparation of optical materials were repeated three times under the same composition and preparation conditions as in the examples. As a result, it was confirmed that by preparing the resins and the like in the optical materials precisely in amounts or relative proportions, it was possible to obtain almost equivalent optical properties (refractive index, Abbe's number, secondary dispersion characteristics and transmittance) in all the cases.

Regarding the fine ITO particles used in comparative example 2, the processes from the fabrication of fine particles to the preparation of optical materials were similarly repeated three times under the same conditions as in the comparative example such that a fine-particle size equivalent to the comparative example can be obtained. However, even under the same preparation conditions for fine ITO particles, there were minute variations in the optical properties. In particular, transmittance of colors from yellow to perse varied greatly. Also, it was confirmed that the transmittance (or absorption) of the fine ITO particles could be closely related to the other physical properties described above. It is believed that slight differences in manufacturing conditions can generally cause great changes in oxygen deficiency or the degree of crystallinity of ITO and that such minute differences affect the physical properties.

Consequently, it was confirmed that fine particles of an organic substance, namely PEDOT/PSS used in the examples, has particularly excellent reproducibility of optical properties compared to inorganic fine particles of ITO or the like.

Although a double-layered diffraction optical element in which the diffraction planes of two diffraction optical elements are placed in opposing relation to each other has been described in the present embodiment, the present invention is not limited to this and is applicable to a multi-layered diffraction optical element in which more than two diffraction optical elements are stacked.

EXAMPLE 3

Figure 12:
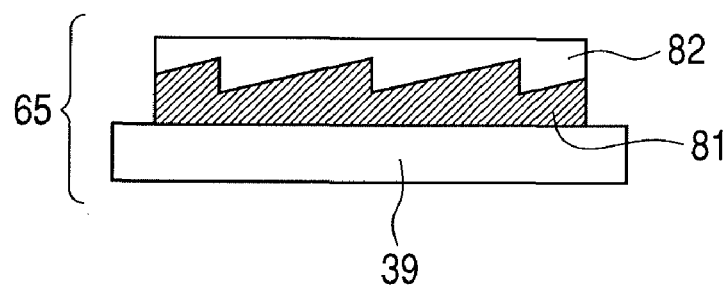
FIG. 12 is a sectional view of a double-layered diffraction optical element.

This example concerns a multi-layered diffraction optical element which has a configuration shown in FIG. 12. Details of the example will be described with reference to (a), (b) and (c) of FIG. 13 and (a), (b) and (c) of FIG. 14. FIG. 12 is a sectional view illustrating an example of a double-layered diffraction optical element 65. In FIG. 12, the double-layered diffraction optical element 65 includes a glass substrate 39, first layer 81 and second layer 82 stacked on the first layer 81 so as not to form a gap between the first layer 81 and the second layer 82. The second layer 82 is made of an optical material which satisfies the condition $\theta g, F \leq -2vd \times 10^{-3} + 0.59$ shown in examples 1 and 2. The first layer 81 is made of an optical material whose Abbe's number is larger than the Abbe's number of the optical material of the second layer 82. And the first layer 81 is made of an optical material whose refractive index is larger than the refractive index of the optical material of the second layer 82. That is, in case of a stacked type diffraction optical element wherein the first layer 81 and the second layer 82 are stacked without the gap therebetween, in order to obtain a diffraction efficiency, a structure with a combination of the first layer 81 of larger refraction index and of lower, and the second layer 82 of smaller refraction index and of higher dispersion would be necessary.

Functionality the optical element can be expanded if the number of layers is increased.

The diffraction planes in all the examples have a zigzag pattern, but a relief pattern, stepped pattern, kinoform and the like may be used as well.

Figure 13:
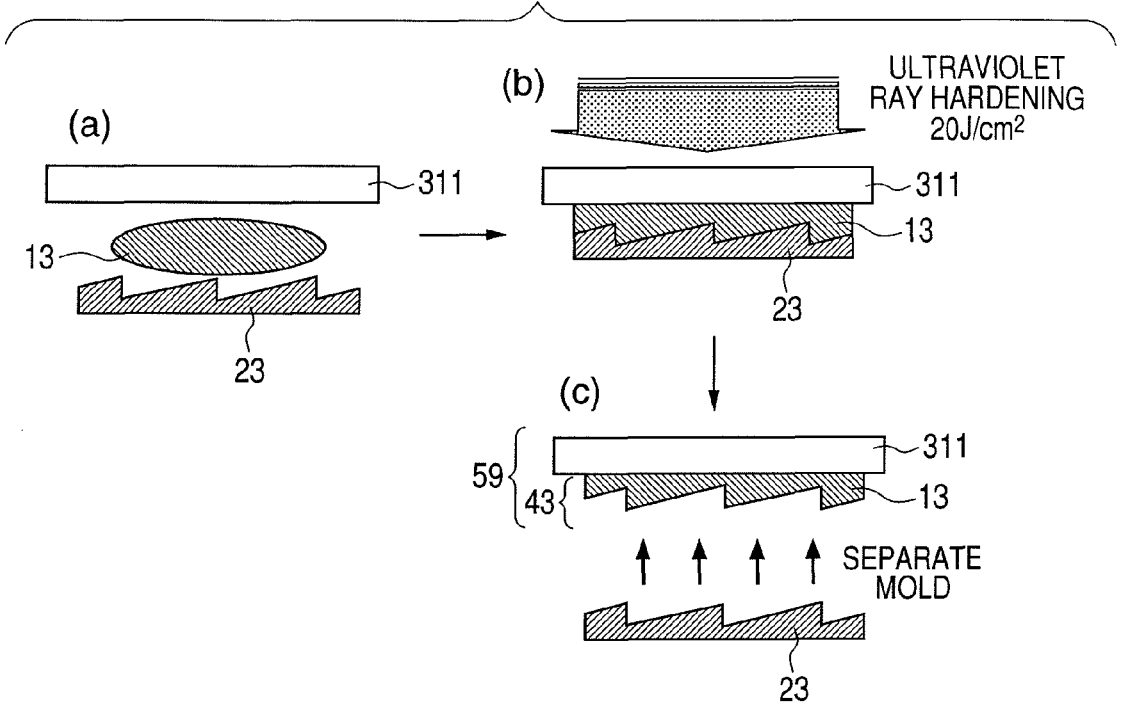
FIG. 13(a), (b) and (c) are sectional views illustrating a molding process of an optical element according to example 3.
Figure 14:
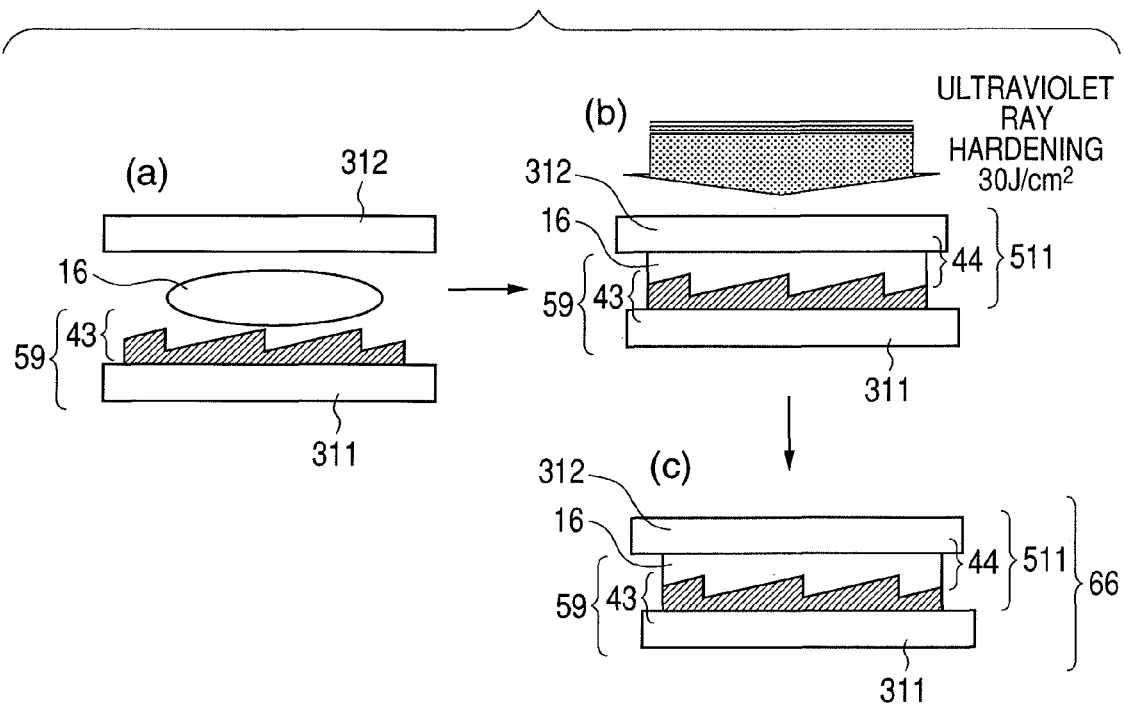
FIG. 14(a), (b) and (c) are sectional views illustrating the molding process of the optical element according to example 3.

First, as illustrated in (a) of FIG. 13, the optical material 13 used in example 2 was supplied to a die 23 formed into a shape of a diffraction grating for this example. Then, as illustrated in (b) of FIG. 13, a flat glass plate 311 of BK7 was placed on the optical material 13 and exposed to light under a condition of 20 J/cm² (40 mW/cm²) using a UV light source (EX250 manufactured by HOYA-SCHOTT Corp.). Subsequently, as illustrated in (c) of FIG. 13, a hardened optical element 43 was removed from the die 23, and thus a diffraction optical element 59 was produced. Optical characteristics of the optical material 13 of the optical element 43 satisfied $\theta g, F \leq -2vd \times 10^{-3} + 0.59$.

On the other hand, an optical material 16 was prepared using photo hardening resin RC-C001 (manufactured by Dainippon Ink and Chemicals Inc.) in which fine particles of $ZrO_2$ were dispersed. Optical characteristics of RC-C001 are as follows: nd=1.5228 and vd=51.42. Optical characteristics of the optical material 16 were as follows: nd=1.5629 and vd=46.85. Next, as illustrated in (a) of FIG. 14, the optical material 16 was supplied to a surface of the diffraction optical element 59 formed into a shape of a diffraction grating. Then, as illustrated in (b) of FIG. 14, a flat glass plate 312 of BK7 was placed on the optical material 16 and exposed to light under a condition of 30 J/cm² (40 mW/cm²) using the UV light source (EX250 manufactured by HOYA-SCHOTT Corp.). Subsequently, as illustrated in (c) of FIG. 14, double-layered diffraction optical element 66 was produced by stacking the diffraction optical element 511 containing a hardened optical element 44 on the diffraction optical element 59 containing a hardened optical element 43. Grating pitches of both the diffraction optical element 59 and diffraction optical element 511 were 80.00 μm. The peaks of both the diffraction optical element 59 and diffraction optical element 511 were 15.30 μm high.

Figure 15:
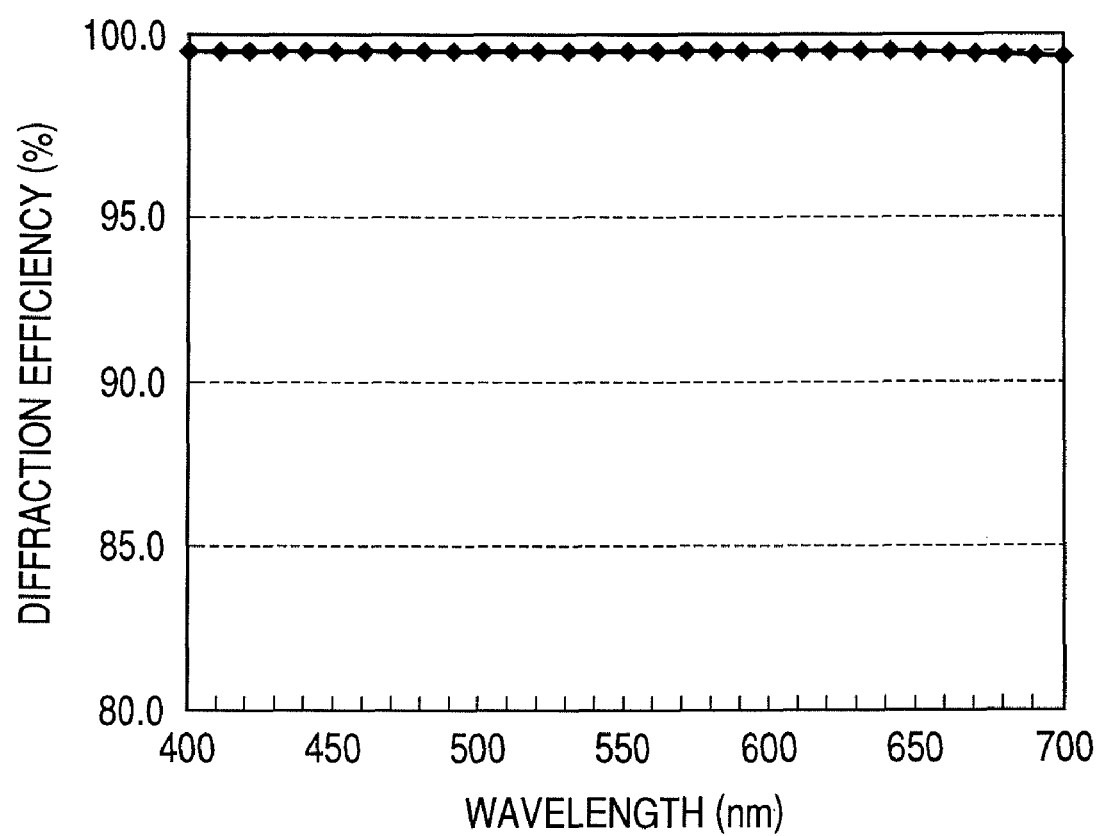
FIG. 15 is a graph illustrating a first order diffraction intensity of the multi-layered diffraction optical element according to example 3.

FIG. 15 is a graph illustrating intensity of first order diffracted light of the fabricated multi-layered diffraction optical element 66 at an incident angle of 0° plotted against wavelength (400 nm to 700 nm), where the abscissa represents the wavelength and the ordinate represents diffraction efficiency. In FIG. 15, the diffraction efficiency is 100.0% at a wavelength of 430 nm, 100.0% at a wavelength of 500 nm, and 99.8% at a wavelength of 700 nm. Thus, the diffraction efficiency of the multi-layered diffraction optical element 66 is higher than 99% over the entire usable wavelength range, resulting in an extremely good intensity wavelength distribution.

The present invention provides an optical material which has high dispersion stability of fine particles, good optical scattering characteristics, and excellent reproducibility of optical properties. The optical material provides high diffraction efficiency. Thus, the use of the optical material enables implementation of a molding method for optical elements, optical elements molded by the molding method, and an optical system which includes the optical elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-003597, filed Jan. 11, 2007, which is hereby incorporated by reference herein in its entirety.

What is claimed is:

1. A stacked type diffraction optical element comprising:
a first diffraction optical element having a diffraction shape formed on one surface thereof comprising (a) an organic resin and (b) fine particles of a conductive polymer material dispersed into the organic resin, wherein the Abbe's number (vd) and a secondary dispersion ($\theta g, F$) meet a relation:

$$\theta g, F \leq -2vd \times 10^{-3} + 0.59, \text{ and}$$

wherein an average diameter of the fine particles is 2-300 nm; and
a second diffraction optical element, the Abbe's number of which is larger than the Abbe's number of the first diffraction optical element, having a diffraction shape formed on one surface thereof,
wherein a diffraction plane of the diffraction shape of the first diffraction optical element and a diffraction plane of the diffraction shape of the second diffraction optical element are disposed in opposition to each other to form a gap therebetween,
wherein a difference between a refractive index of the organic resin and a refractive index of the conductive polymer material is ±0.05, and
wherein the conductive polymer material is poly 3,4-ethylenedioxythiophene/polystyrenesulfonic acid (PEDOT/PSS).

2. The optical element according to claim 1, wherein the Abbe's number (vd) of the first diffraction optical element is 22-27, and
wherein the secondary dispersion ($\theta g, F$) of the first diffraction optical element is 0.41-0.46.

3. A stacked type diffraction optical element comprising:
a first diffraction optical element having a diffraction shape formed on one surface thereof comprising (a) an organic resin and (b) fine particles of a conductive polymer material dispersed into the organic resin, wherein the Abbe's number (vd) and a secondary dispersion ($\theta g, F$) meet a relation:

$$\theta g, F \leq -2vd \times 10^{-3} + 0.59, \text{ and}$$

wherein an average diameter of the fine particles is 2-300 nm; and
a second diffraction optical element, the Abbe's number of which is larger than the Abbe's number of the first diffraction optical element, and refractive index of which is larger than the refractive index of the first diffraction optical element, having a diffraction shape formed on one surface thereof,
wherein a diffraction plane of the diffraction shape of the first diffraction optical element is disposed on a diffraction plane of the diffraction shape of the second diffraction optical element so as not to form a gap therebetween,
wherein a difference between a refractive index of the organic resin and a refractive index of the conductive polymer material is ±0.05, and
wherein the conductive polymer material is poly 3,4-ethylenedioxythiophene/polystyrenesulfonic acid (PEDOT/PSS).

4. The optical element according to claim 3, wherein the Abbe's number (vd) of the first diffraction optical element is 22-27, and
wherein the secondary dispersion ($\theta g, F$) of the first diffraction optical element is 0.41-0.46.

* * * * *